(12) United States Patent
Tashiro et al.

(10) Patent No.: US 12,325,465 B2
(45) Date of Patent: Jun. 10, 2025

(54) FRONT STRUCTURE OF VEHICLE

(71) Applicant: MAZDA MOTOR CORPORATION, Hiroshima (JP)

(72) Inventors: Kuniyoshi Tashiro, Hiroshima (JP); Masayuki Furutani, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 464 days.

(21) Appl. No.: 17/819,658

(22) Filed: Aug. 15, 2022

(65) Prior Publication Data
US 2023/0106302 A1 Apr. 6, 2023

(30) Foreign Application Priority Data
Oct. 1, 2021 (JP) ................................. 2021-162535

(51) Int. Cl.
*B62D 21/15* (2006.01)
*B60R 19/02* (2006.01)
*B60R 19/34* (2006.01)

(52) U.S. Cl.
CPC .......... *B62D 21/152* (2013.01); *B60R 19/023* (2013.01); *B60R 19/34* (2013.01)

(58) Field of Classification Search
CPC ..... B62D 21/152; B60R 19/023; B60R 19/34; B60R 2019/186; B60R 2019/1886; B60R 2021/343; B60R 19/12; B60R 19/24; B60R 21/34
USPC ............ 296/187.01, 187.04, 187.09, 187.12, 296/193.09, 203.02
See application file for complete search history.

(56) References Cited

U.S. PATENT DOCUMENTS

| 6,926,321 | B2 * | 8/2005 | Zipfel ..................... B60R 19/26 293/132 |
| 7,007,385 | B2 * | 3/2006 | Tarahomi ............... C25D 13/12 29/460 |
| 8,567,854 | B2 * | 10/2013 | Nishi ..................... B60R 19/18 296/187.04 |

(Continued)

FOREIGN PATENT DOCUMENTS

| JP | 2007216706 A | * | 8/2007 |
| JP | 2015136947 A | * | 7/2015 |

(Continued)

*Primary Examiner* — Joseph D. Pape
(74) *Attorney, Agent, or Firm* — Studebaker Brackett PLLC

(57) ABSTRACT

There are provided a vehicle-body member provided at a vehicle-body front portion, a bumper-face support member supporting a bumper face in front of the vehicle-body member, and plural brackets fixedly connecting the vehicle-body member and the bumper-face support member. The bracket comprises an inclination portion which is inclined such that a front side thereof is positioned on an inward or outward side, in the vehicle width direction, of the bracket, a high-rigidity portion, at least part of which is positioned at the inclination portion and which is configured to have high rigidity against an input of a load applied in a vehicle longitudinal direction, and a fragile portion which is configured to be deformable by receiving the input of the load applied in the vehicle longitudinal direction. The high-rigidity portion and the fragile portion are provided adjacently to each other in the vehicle longitudinal direction.

12 Claims, 13 Drawing Sheets

(56) References Cited

U.S. PATENT DOCUMENTS

| | | | | |
|---|---|---|---|---|
| 8,720,976 B2* | 5/2014 | Oyama | ................ | B62D 21/152 |
| | | | | 296/187.09 |
| 8,931,824 B2* | 1/2015 | Lopez | .................... | B60R 21/34 |
| | | | | 296/187.04 |
| 11,691,579 B2* | 7/2023 | Takahashi | ................ | B60R 19/26 |
| | | | | 293/132 |
| 2005/0046155 A1* | 3/2005 | Tomford | ............... | B60R 21/217 |
| | | | | 280/732 |
| 2017/0120850 A1 | 5/2017 | Sugano et al. | | |
| 2019/0143920 A1* | 5/2019 | Nakamoto | ............. | B60K 11/04 |
| | | | | 296/193.09 |
| 2021/0031701 A1* | 2/2021 | Kitagawa | ................ | B60R 11/02 |

FOREIGN PATENT DOCUMENTS

| | | | |
|---|---|---|---|
| JP | 2015-196443 A | 11/2015 | |
| WO | WO-2011144976 A1 * | 11/2011 | ........... B60H 1/2209 |
| WO | 2012/073621 A1 | 6/2012 | |

\* cited by examiner

FRONT STRUCTURE OF VEHICLE

BACKGROUND OF THE INVENTION

The present invention relates to a front structure of a vehicle which comprises a bumper face provided at a vehicle front portion and a vehicle-body member supporting the bumper face from behind at a vehicle-body front portion.

Japanese Patent Laid-Open Publication No. 2015-196443 discloses a bumper attachment structure in which a bumper face is attached to a protrusion piece portion protruding forwardly from a radiator upper support as a vehicle-body member (a shroud upper provided at an upper portion of a radiator shroud).

As disclosed in the above-described patent document, a structure in which the bumper face is supported in a cantilever shape by the vehicle-body member, such as the shroud upper provided at the vehicle-body front portion is known.

Meanwhile, vehicles having a high vehicle-height are generally configured such that a front end portion of a bonnet (engine hood) provided at a front upper end of the vehicle is located at the same level as a thigh portion of a pedestrian. Accordingly, a structure in which the front end portion of the bonnet is retreated from a foremost portion of the vehicle so as to meet the pedestrian protection requirement, such as reduction of an influence on a knee's ligament of the pedestrian, in a vehicle collision against the pedestrian is known among the vehicles having the high vehicle-height.

Further, a latch which is configured to engage with a striker protruding downwardly from the bonnet in a bonnet's closed state and lock the bonnet is generally provided at the vehicle-body member, such as the shroud upper. Therefore, many of the vehicles having the high vehicle-height tend to have a structure in which the vehicle-body member, such as the shroud upper, is also retreated together with the bonnet according to the above-described retreat of the front end portion of the bonnet.

In this structure, since a longitudinal distance, in a longitudinal direction, between a bumper-face support member which has an attachment portion for attaching the bumper face and the vehicle-body member, such as the shroud upper which supports the bumper-face support member in the cantilever shape from behind, becomes long, a moment applied to the vehicle-body member becomes large, so that there is a concern that the support rigidity and the assembling accuracy of the bumper face may deteriorate.

For this problem, it may be considered that a moment length (an arm length of moment) can be suppressed (decreased) by connecting the bumper-face support member and the vehicle-body member, such as the shroud upper, by a bracket with the shortest distance. In this case, however, there occurs a new problem that a sufficient stroke (collision stroke) for allowing the vehicle-body front portion to be retreated for absorbing the vehicle frontal collision may not be secured.

SUMMARY OF THE INVENTION

The present invention has been devised in view of the above-described problems, and an object of the present invention is to provide a front structure of a vehicle which can compatibly improve the support rigidity and the assembling accuracy of the bumper face in a normal state and secure the collision stroke of the vehicle front portion in the vehicle frontal collision even if the vehicle has the high vehicle-height.

The front structure of the vehicle of the present invention comprises a vehicle-body member provided at a vehicle-body front portion, a bumper-face support member extending in a vehicle width direction in front of the vehicle-body member and having an attachment portion where a bumper face is attached, and plural brackets fixedly connecting the vehicle-body member and the bumper-face support member, wherein the bracket comprises an inclination portion which is inclined such that a front side thereof is positioned on an inward or outward side, in the vehicle width direction, of the bracket, a high-rigidity portion, at least part of which is positioned at the inclination portion and which is configured to have high rigidity against an input of a load applied in a vehicle longitudinal direction, and a fragile portion which is configured to be deformable by receiving the input of the load applied in the vehicle longitudinal direction, and the high-rigidity portion and the fragile portion are provided adjacently to each other in the vehicle longitudinal direction.

According to the present invention, the rigidity of the bracket in the normal state can be improved by the high-rigidity portion. Accordingly, the support rigidity and the assembling accuracy of the bumper face can be improved. Further, in the vehicle frontal collision, a bending stress is easily generated at the bracket by the inclination portion for the load input from the vehicle forward side, so that the fragile portion adjacent to the high-rigidity portion is deformed easily. Accordingly, the collision stroke can be secured by the bracket being bent and deformed in the vehicle frontal collision.

In an embodiment of the present invention, the bracket may comprise a base portion which extends forwardly from a fixation portion of the bracket to the vehicle-body member by a first angle in a plan view and the inclination portion which extends forwardly from a front end portion of the base portion via a bending portion by a second angle in the plan view.

According to this embodiment, the bracket is made to be bent and deformed by the bending portion in the vehicle frontal collision, so that the bracket can be crushed properly.

In another embodiment of the present invention, the bending portion may be located at the same position, in the vehicle longitudinal direction, as the high-rigidity portion.

According to this embodiment, the bending portion can be securely bent and deformed as a bending-deformation causing point even at the high-rigidity portion having the high resistance against the bending load, so that the energy-absorption quantity of the bracket in the vehicle frontal collision can be improved.

In another embodiment of the present invention, the bracket may comprise a side wall portion which extends in a vertical direction and in the vehicle longitudinal direction and a flange portion which is configured to be bent from an upper end of the side wall portion via a corner portion, and the fragile portion may be a bead portion provided at the corner portion.

According to this embodiment, the rigidity of the bracket can be increased by the corner portion (ridgeline) extending in the vehicle longitudinal direction and also the bending deformation of the bracket can be caused by the bead portion as the fragile portion in the vehicle frontal collision.

In another embodiment of the present invention, the fragile portion may be a recess portion which is configured to be recessed downwardly, in a side view, at an upper end portion of the bracket.

According to this embodiment, since the ridgeline extending along in the vehicle width direction is formed at the recess portion provided at the upper end portion of the bracket, the recess portion causes the bracket to be deformed such that its front portion positioned on the forward side of the recess portion is bent downwardly relative to its rear portion positioned on the rearward side of the recess portion when the downward collision load is inputted to the bumper-face support member. Accordingly, reduction of the damage degree of a collision object in the vehicle frontal collision (the pedestrian's protection performance) can be improved by the downward bending deformation of the bracket.

In another embodiment of the present invention, it is preferable that the recess portion and the bead portion be provided at the same position, in the vehicle longitudinal direction, of the bracket.

According to this embodiment, securing of the collision stroke by the deformation, in the vehicle longitudinal direction, of the bracket and reducing of the damage degree of the collision object (the pedestrian's protection performance) by the downward deformation of the bracket in the vehicle frontal collision can be compatibly attained.

In another embodiment of the present invention, it is preferable that at least one of a front end portion and a rear end portion of the high-rigidity portion and the recess portion be provided at the same position, in the vehicle longitudinal direction, of the bracket.

According to this embodiment, securing of the collision stroke by the deformation, in the vehicle longitudinal direction, of the bracket and reducing of the damage degree of the collision object (the pedestrian's protection performance) by the downward deformation of the bracket in the vehicle frontal collision can be compatibly attained.

As described above, according to the present invention, improving of the support rigidity and the assembling accuracy of the bumper face in the normal state and securing of the collision stroke of the vehicle front portion in the vehicle frontal collision can be compatibly attained even if the vehicle has the high vehicle-height.

Herein, it is preferable that the above-described high-rigidity portion be a bead portion which is formed at a side wall portion of said bracket and extends in the vehicle longitudinal direction.

Further, it is preferable that the above-described bead portion be composed of a pair of bead portions which are arranged in parallel to each other, having a distance in a vertical direction, and each of the pair of bead portions be configured to protrude inwardly in the vehicle width direction.

The present invention will become apparent from the following description which refers to the accompanying drawings.

DETAILED DESCRIPTION OF THE INVENTION

Figure 1:
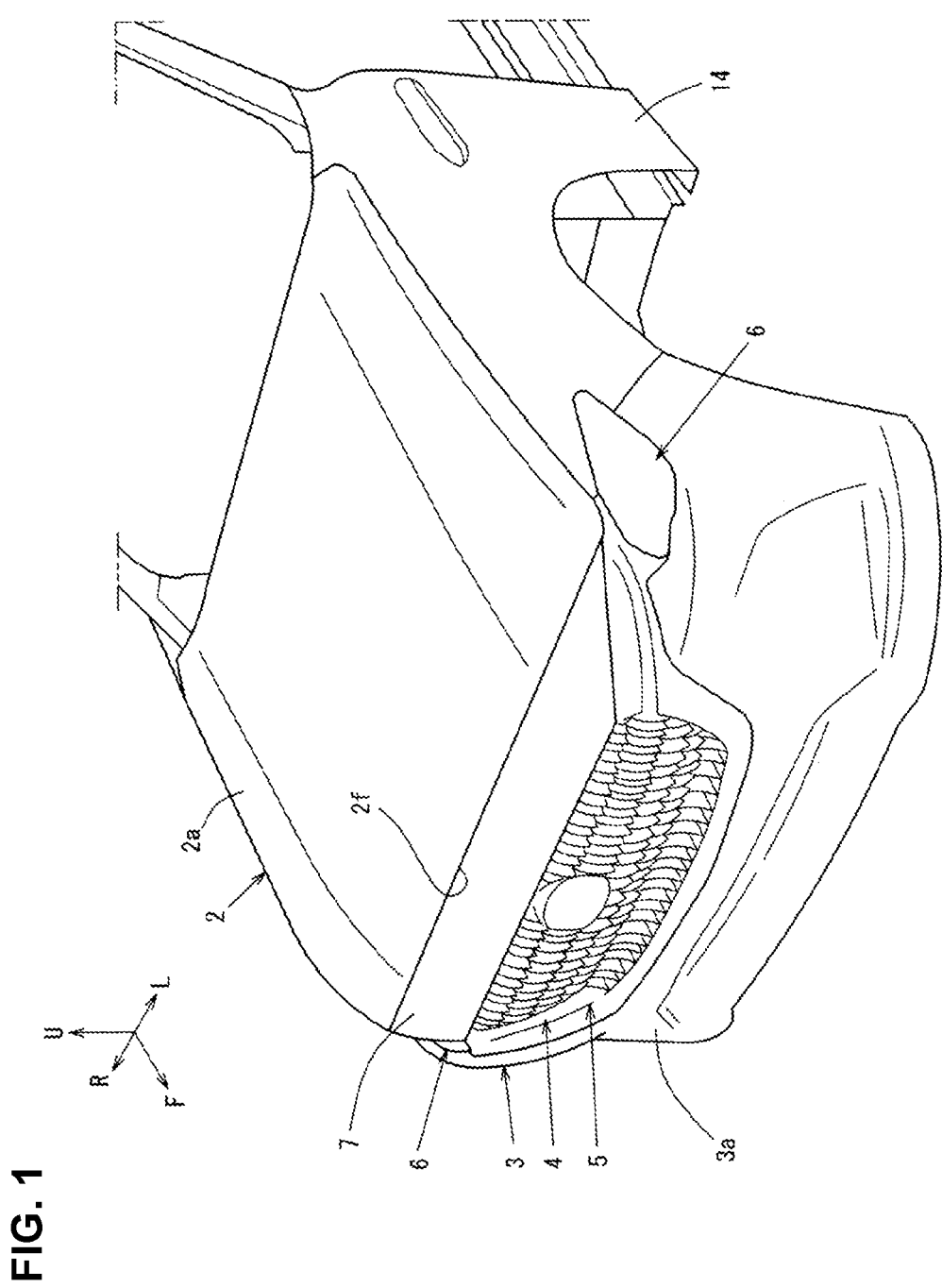
FIG. 1 is an exterior perspective view of a front portion of a vehicle of the present embodiment.

Hereafter, an embodiment of the present invention will be described referring to the drawings. In the drawings, an arrow F shows a vehicle forward side, an arrow U shows a vehicle upward side, an arrow R shows a vehicle rightward side, and an arrow L shows a vehicle leftward side.

A vehicle to which a front structure of the present invention is applied is an automobile, such as SUV or minivan, which has a relatively high vehicle-height compared with a sedan type or a hutch-back type. The front structure of the vehicle of the present embodiment is configured to be substantially symmetrical laterally.

As shown in FIG. 1, a front portion of the vehicle is provided with a bonnet 2 which covers over a power-unit room 1 (see FIG. 2) where a power unit (not illustrated), such as an engine, is installed and a bumper face 3 which is made of synthetic resin and arranged at a foremost position of the vehicle. A front-face opening portion 4 to take in flesh air (traveling air) into a vehicle body is formed at the bumper face 3.

The front-face opening portion 4 is formed at a portion of the bumper face 3 which is located at an upper-and-central side, in a vehicle width direction, of the bumper face 3, which is an outside-air induction port to introduce outside air for cooling into the power-unit room 1 in order to assist heat radiation of a radiator (not illustrated) which is arranged at a front side of the power-unit room 1 located and in back of the bumper face 3.

The front-face opening port 4 is covered with a front grille 5 in a state where the air permeability of the power-unit room 1 is secured. A pair of headlight opening portions 6 for arranging headlamps 6a (see FIG. 4) are formed at right- and-left upper portions of the bumper face 3.

The front grille 5 extends laterally up to an inside portion, in the vehicle width direction, of each of the headlight opening portions 6 at a position which corresponds, in a front view, to the front-face opening portion 4 provided at a central portion, in the vehicle width direction, of the bumper face 3, and is attached to the bumper face 3.

At an upper-end side of the bumper face 3 is provided a bumper face upper 7 which constitutes an upper end portion of the bumper face 3 and is continuous to a front end 2f of the bonnet 2. The bumper face upper 7 is a portion which is integrally formed at a body portion 3a (lower portion) of the bumper face 3, which forms respective upper-side parts of the front-face opening portion 4 and the right-and-left headlight opening portions 6. The bumper face upper 7 is a flat-plate member with an upper face which has an inclination corresponding to a front-lowering inclination of an upper face of the bonnet 2.

The bonnet 2 is pivotally supported at the vehicle body via a hinge (not illustrated) through its rear end so that it is openable over the power-unit room 1.

Figure 12:
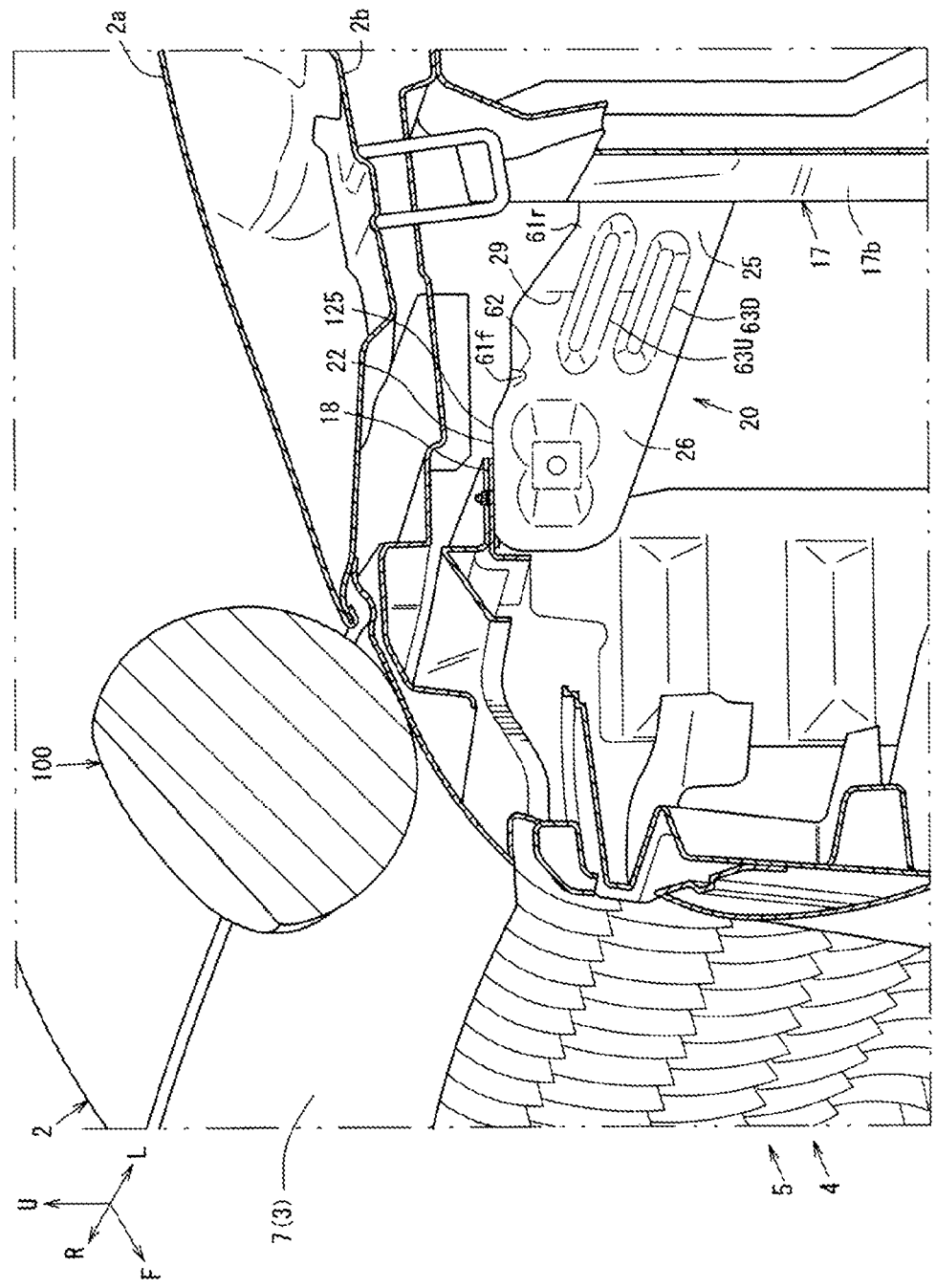
FIG. 12 is a perspective sectional view taken along line B-B of FIG. 4, which shows a situation just before the collision object hits against a front end of a bonnet from above.

As shown in FIG. 12, the bonnet 2 is comprised of a bonnet outer panel 2a and a bonnet inner panel 2b which are integrated by means of hemming joint, and a bonnet reinforcement, not illustrated, is adhesively fixed to a lower-face side of the bonnet outer panel 2a.

Herein, at a front portion of a central portion, in the vehicle width direction, of the bonnet inner panel 2b is provided a striker (not illustrated) which protrudes downwardly. This striker is configured to engage with a latch (not illustrated) provided at a vehicle-body side in a closed state of the bonnet 2 for locking.

Figure 2:
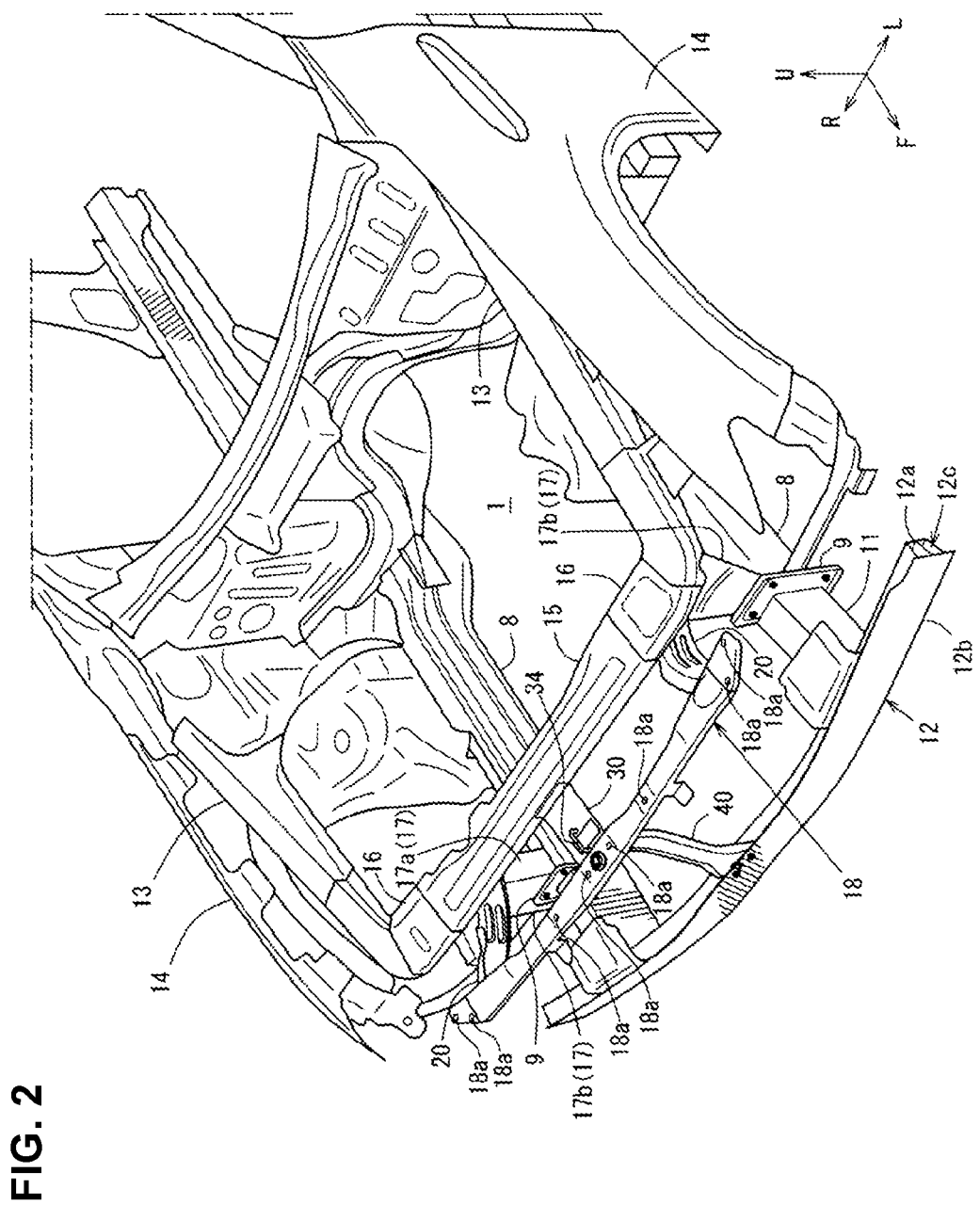
FIG. 2 is a perspective view of the front portion of the vehicle of the present embodiment.
Figure 3:
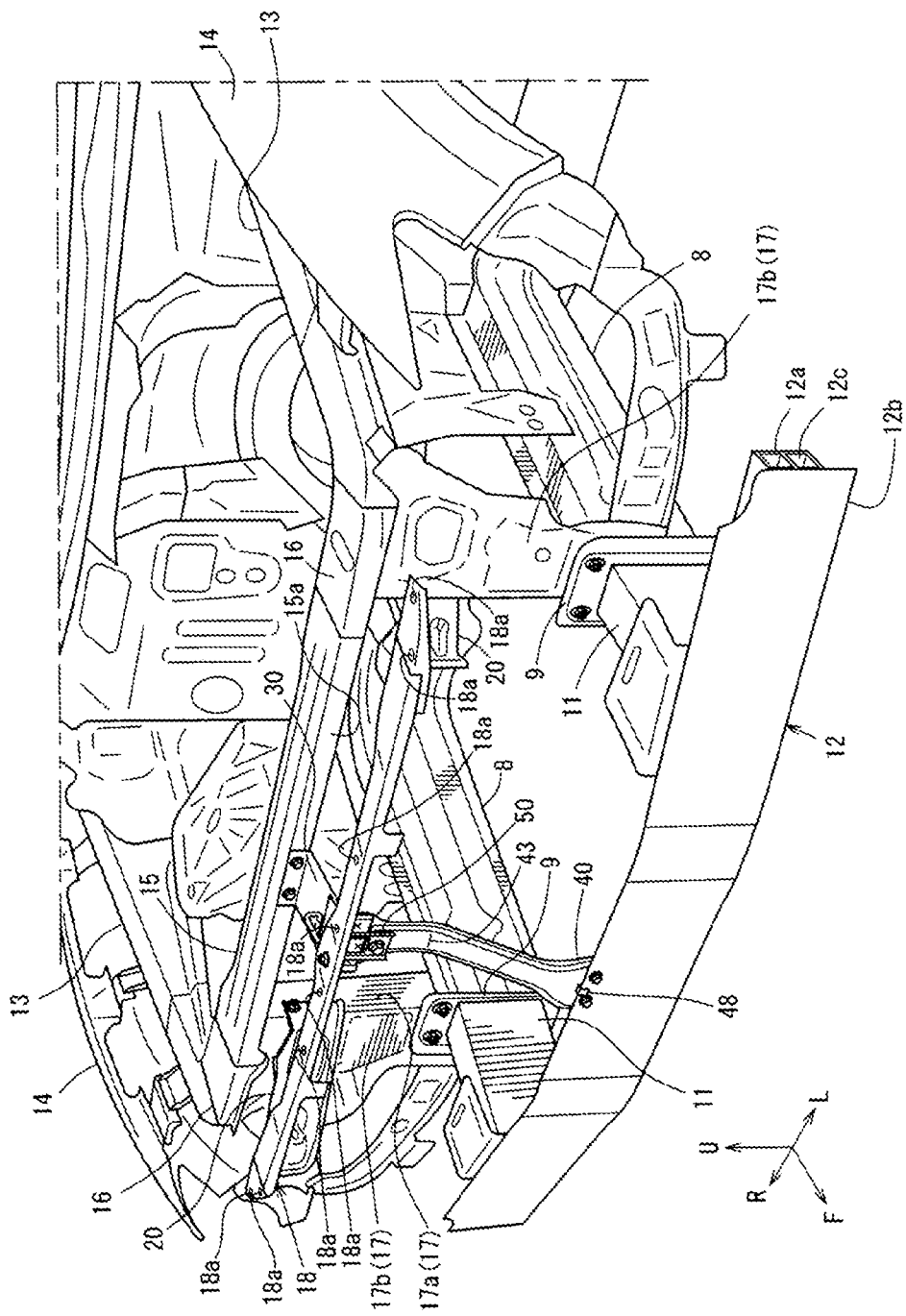
FIG. 3 is an enlarged perspective view of the front portion of the vehicle, when viewed from a further front side in FIG. 2.
Figure 4:
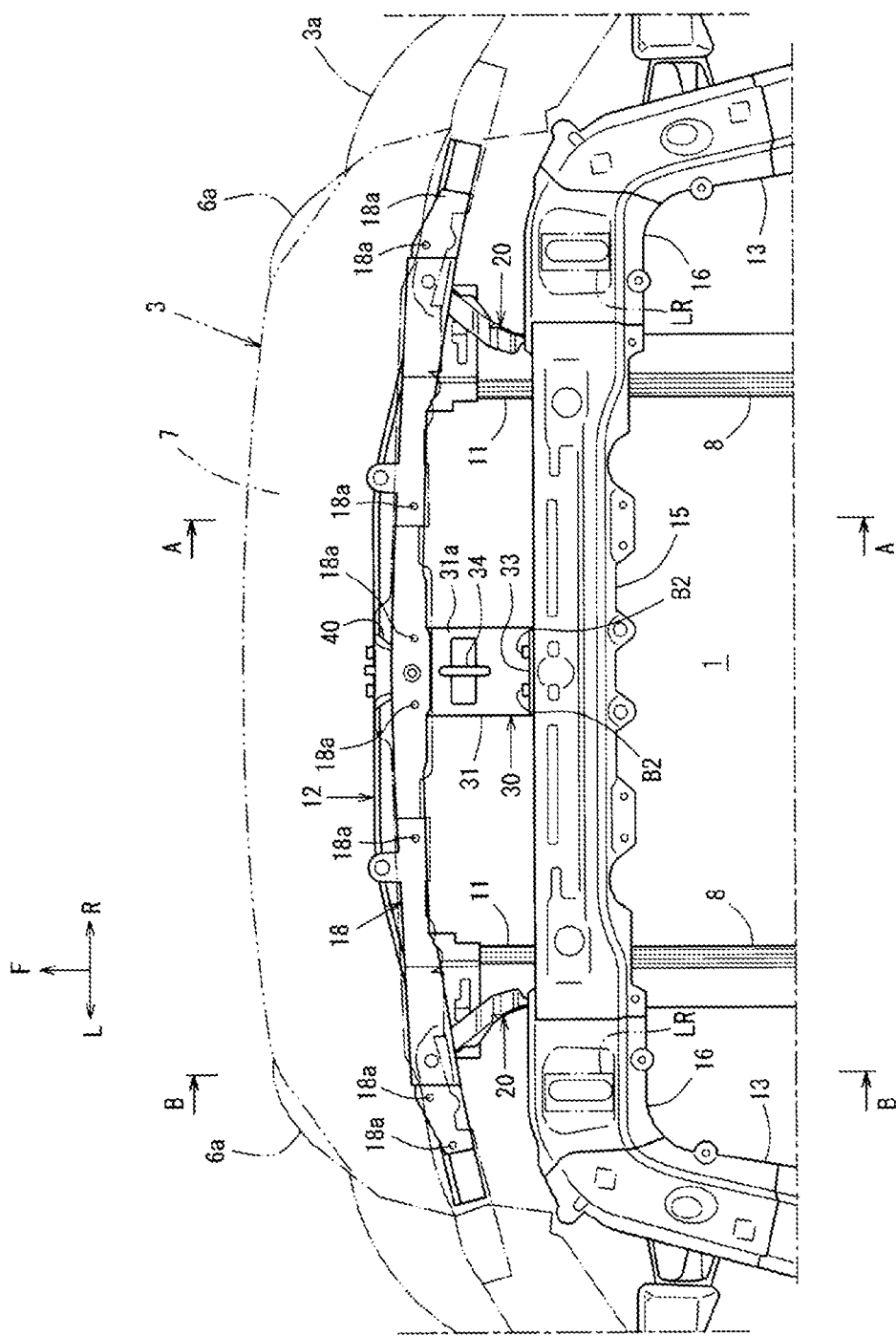
FIG. 4 is a plan view showing a major part of the front portion of the vehicle of the present embodiment.

As shown in FIGS. 2-4, a front side frame 8 extending in a vehicle longitudinal direction is provided at each of right-and-left both sides of the power-unit room 1. A crash can 11 extending forwardly is attached to a front end of the front side frame 8 via a set plate 9 (see FIGS. 2 and 3).

As shown in FIGS. 2-4, a bumper beam 12 (bumper reinforcement) which extends in the vehicle width direction so as to interconnect respective front ends of the right-and-left crash cans 11 is provided at a front-side position of the power unit room 1 which is located below and behind the bumper face 3.

As shown in FIGS. 2 and 3, the bumper beam 12 is primarily composed of a bumper-beam body portion 12a which has a nearly hat-shaped cross section opened forwardly and a closing plate portion 12b which closes a forwardly-opened portion of the bumper-beam body portion 12a, and a closed-cross section 12c extending in the vehicle width direction is formed between the bumper-beam body portion 12a and the closing plate portion 12b. The bumper beam 12 is positioned at the front end 2f of the bonnet 2 in the vehicle longitudinal direction.

Further, a pair of right-and-left apron reinforcements 13 extending in the vehicle longitudinal direction are provided at upward-side positions inside the vehicle front portion which are located on the outward side, in the vehicle width direction, of the front side fames 8. Herein, in FIGS. 2 and 3, reference character 14 denotes a fender panel which forms an outside face of a vehicle-body front portion, which is supported at the apron reinforcement 13.

As shown in FIGS. 2-4, a shroud upper panel 15 extending straightly in the vehicle width direction is connected to each front end of the pair of right-and-left apron reinforcements 13 via a shroud member 16.

An engaging latch (not illustrated) to engage with a striker (not illustrated) provided at a side of the bonnet 2 as a lock device is arranged at the above-described shroud member 16. Herein, an area LR enclosed by an imaginary line in FIG. 4 corresponds to a latch arrangement point.

As shown in FIG. 4, each front portion of the right-and-left front side frames 8 is located just below an end-outside portion of the shroud upper panel 15. Further, as shown in FIGS. 2, 3, 5 and 6, the shroud member 16 and the front portion of the front side frame 8 are connected by a shroud-upper support frame 17 extending in a vertical direction.

That is, the shroud upper panel 15 is, as described above, supported by the pair of right-and-left apron reinforcements 13 via the shroud members 16 and supported by the pair of right-and-left front side frames 8 via the shroud members 16 and the shroud-upper support frames 17.

As shown in FIGS. 3 and 5-7, the shroud-upper support frame 17 is integrally formed by a vehicle-width-direction inner face portion 17a which is of a vertical wall shape and has its plate thickness in the vehicle width direction and a front face portion 17b which is of the vertical wall shape, extends outwardly, in the vehicle width direction, from a front end of the vehicle-width-direction inner face portion 17a, and has its plate thickness in the vehicle longitudinal direction.

Herein, each of the apron reinforcement 13, the shroud upper panel 15, the front side frame 8, the shroud-upper support frame 17, the shroud member 16, and the bumper beam 12 is a vehicle-body member.

Further, as shown in FIGS. 2-4 and 7, a bumper-face support member 18 is arranged at a position inside the vehicle front portion which is located in front of the shroud upper panel 15. The bumper-face support member 18 extends in the vehicle width direction having a slightly shorter extension length than the bumper beam 12 (see FIG. 4), and is arranged substantially at the same level as the shroud upper panel 15 at a position which nearly corresponds to the front portion of the bonnet 2 in the vehicle longitudinal direction, in other words, substantially at the same position as the bumper beam 12 in the vehicle longitudinal direction (see FIGS. 3 and 7).

The bumper-face support member 18 is arranged just below the bumper face upper 7 of the bumper face 3 and supports the bumper face 3 from just below the bumper face upper 7. The bumper-face support member 18 is attached to a vehicle-body inside portion of the bumper face upper 7 by a bolt or the like. Herein, reference character 18a in FIGS. 2-4 denotes a bumper-face attachment hole where the bumper face 3 (see FIG. 1) is attached by fastening means (bolt and nut) (not illustrated).

Further, a radiator shroud (not illustrated) is arranged in a front area of the power-unit room 1 at a position behind the bumper-face support member 18. The radiator shroud is supported at the vehicle-body member (e.g., the shroud upper panel 15, the front side frame 8 and the like).

The radiator shroud is configured to be rectangular, in an elevational view, and arranged in the front area of the power unit room 1 at a position between the front side frames 8, and supports the radiator (not illustrated) and others. The radiator shroud and the radiator are provided to stand and face the front-face opening 4 from behind, respectively.

Further, as shown in FIGS. 2-6, at the front portion of the vehicle body are provided plural brackets 20, 30 which fixedly connect the vehicle-body member (15, 17) and the bumper-face support member 18 and a stay 40 which connects the bumper-face support member 18 and the bumper beam 12 in the vertical direction at the front portion of the vehicle body.

The brackets 20, 30 comprise the outside brackets 20 which are arranged at both outsides, in the vehicle width direction, of the vehicle body and the center bracket 30 which is arranged at the middle, in the vehicle width direction, of the vehicle body (i.e., the position corresponding to the stay 40 in the vehicle width direction). Thus, there are three brackets in total.

Figure 5:
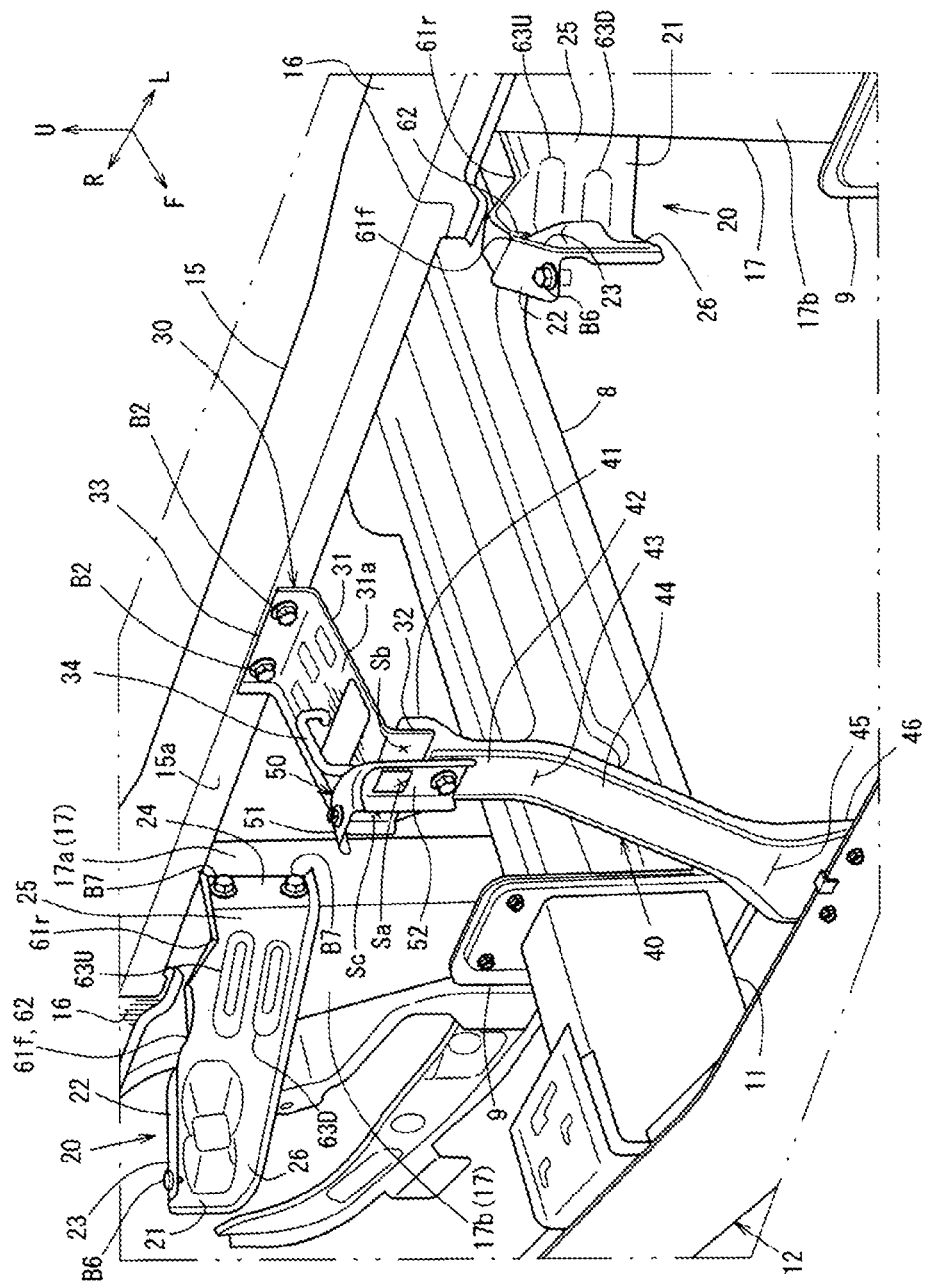
FIG. 5 is an enlarged perspective view of a central part, in a vehicle width direction, of the front portion of the vehicle in a state where a bumper-face support member is removed in FIG. 3.
Figure 6:
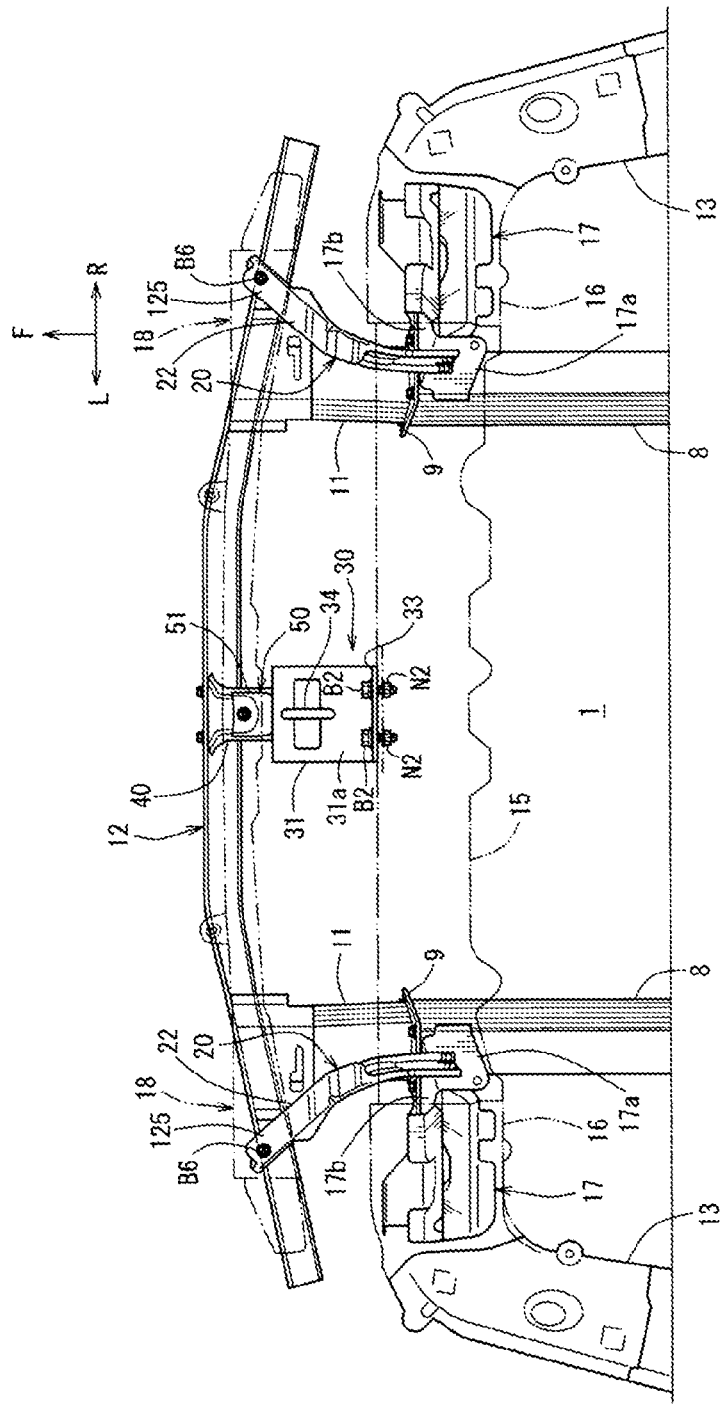
FIG. 6 is a plan view showing the major part of the front portion of the vehicle shown in FIG. 4, wherein a bumper face is removed, and a shroud upper panel, a shroud member and the bumper-face support member are shown by imaginary lines.

As shown in FIG. 5, the middle bracket 30 comprises a bracket body portion 31 which extends straightly in the vehicle longitudinal direction, in a vehicle plane view, between the stay 40 and the shroud upper panel 15 and a front flange portion 32 and a rear flange portion 33, which are formed integrally. In the present embodiment, the middle bracket 30 is made of a plate member extending in the vehicle longitudinal direction and in the vehicle width direction which is bent through pressing process or the like. Herein, as shown in FIGS. 4-6, a striker 34 of a safety lock device is provided to stand upwardly at an upper face portion 31a of the bracket body portion 31.

Herein, an engaging lever (not illustrated) of the safety lock device is provided at a front central portion of the bonnet 2 so as to engage with or disengage from a striker 34. The safety lock device is a known device which is configured to restrain an opening move of the bonnet 2 even if a lock of a lock device (not illustrated) is released unexpectedly, thereby keeping a slightly-opened state of the bonnet 2, in order that the bonnet 2 is prevented from opening improperly because of a traveling-air pressure or the like during vehicle traveling. In the present embodiment, the safety lock device is arranged at a different position from the lock device (see the area LR enclosed by the imaginary line in FIG. 4) as described above (see FIG. 4).

As shown in FIG. 5, the middle bracket 30 extends forwardly from a vehicle rearward side such that its front portion straddles an upper end of the stay 40 from above, and contacts an upper portion of the stay 40 (an upper portion of an upper flange portion 41 described later) from a vehicle forward side. In the present embodiment, the upper flange portion 41 and the front flange portion 32 are spot-welded at, in total, three points of a central point Sa and both-side points Sb, Sc. An "X" mark in FIG. 5 shows a spot-welding application point.

Meanwhile, the rear flange portion 33 extends upwardly from a rear end of the bracket body portion 31, and contacts the lower flange portion 15a of the shroud upper panel 15 from the vehicle forward side. As shown in FIGS. 4-6, the rear flange portion 33 of the middle bracket 30 and the lower flange portion 15a of the shroud upper panel 15 are fastened together by a bolt B2 and a nut N2 as fastening means (see FIG. 6).

Thus, the middle bracket 30 connects the shroud upper panel 15 and the stay 40. Herein, the outside bracket 20 will be described later.

Further, the stay 40 is made of a meal member which has a width in the vehicle width direction and is elongated in the vertical direction. Specifically, as shown in FIG. 5, the stay 40 comprises the upper flange portion 41, a first extension portion 42 which straightly extends downwardly from a lower end of the upper flange portion 41 in the vertical direction, a second extension portion 44 which straightly extends from a lower end of the first extension portion 42 via the first bending portion 43 in an inclined shape such that its lower side is located on the vehicle forward side, and a lower flange portion 46 which extends downwardly from a lower end of the second extension portion 44 via a second bending portion 45. The above-described first bending portion 43 is a deformation promotion portion which is configured to be bent and deformed when a collision load applied downwardly is inputted to the bumper-face support member 18.

As shown in FIG. 5, the stay 40 is connected to the bumper-face support member 18 via a gusset 50.

The gusset 50 comprises a lateral plate portion 51 which extends horizontally in the vehicle longitudinal direction and supports a lower side of the bumper-face support member 18 and a vertical plate portion 52 which extends downwardly from a rear end of the lateral plate portion 51, which is made of a metal plate extending in an inverse-L shape in a vehicle side view and has its width in the vehicle width direction.

The lateral plate portion 51 supports the bumper-face support member 18 from below as shown in FIG. 6, and the vertical plate portion 52 is joined to the upper portion of the stay 40 (the upper portion of the upper flange portion 41) from the vehicle forward side such that the front flange portion 32 of the middle bracket 30 is interposed between these members as shown in FIG. 5.

Subsequently, the outside bracket 20 will be described. Herein, since the right-and-left outside brackets 20 are configured to be symmetrical laterally, the outside bracket 20 which is arranged at the right side of the vehicle will be described here.

As shown in FIGS. 7, 8A, 8B, 9A and 9B, the outside bracket 20 comprises a side wall portion 21 which extends in the vertical direction and in the vehicle longitudinal direction and an eaves-shaped flange portion 22 which protrudes inwardly, in the vehicle width direction, from an upper end of the side wall portion 21 via a corner portion 23 (see FIG. 9B), which is made of a metal plate which is bent through pressing process or the like.

Figure 8A:
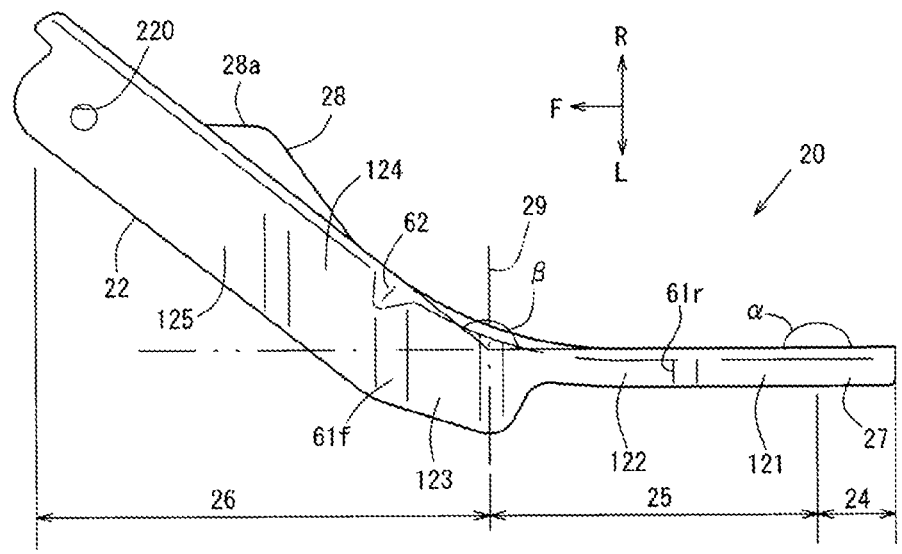
FIG. 8A is a plan view of an outside bracket provided at a vehicle right side.
Figure 8B:
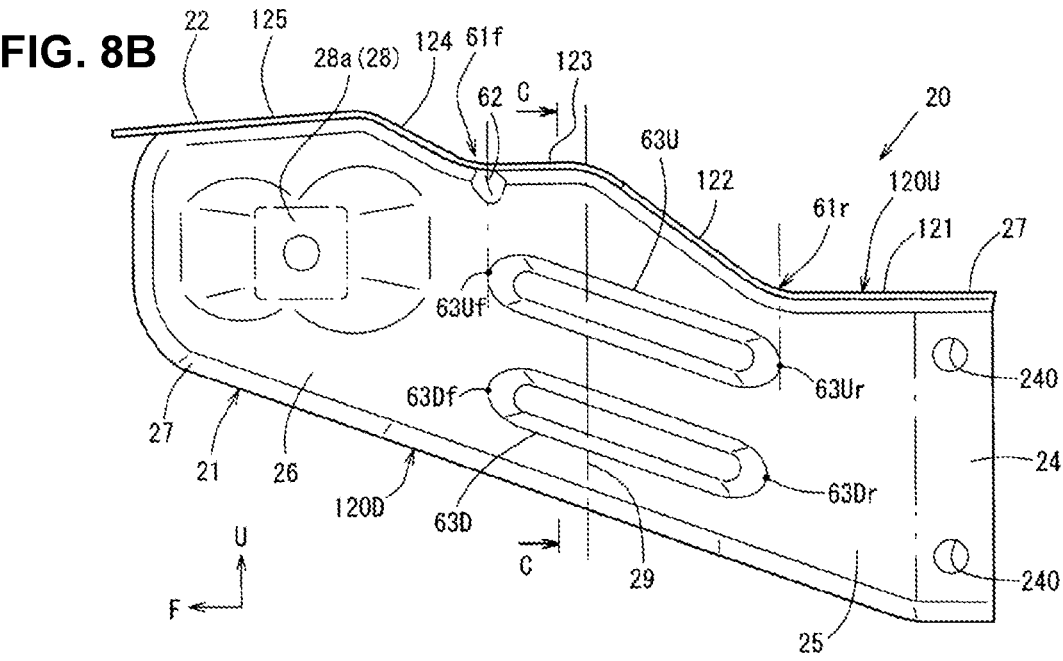
FIG. 8B is a left-side face view of the same.
Figure 9A:
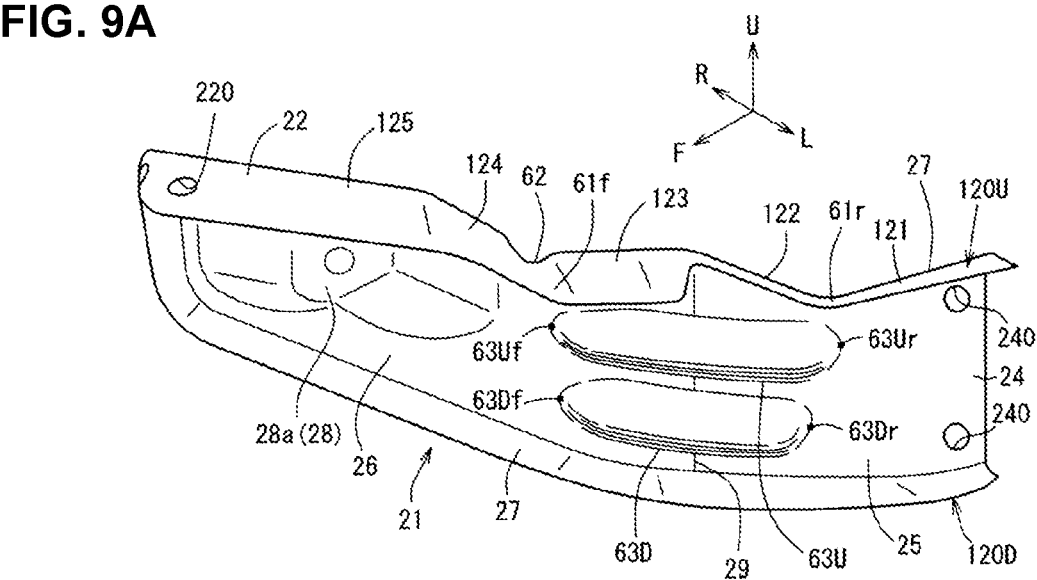
FIG. 9A is a perspective view of the outside bracket provided at the vehicle right side, when viewed from an upper-leftward side of the vehicle.
Figure 9B:
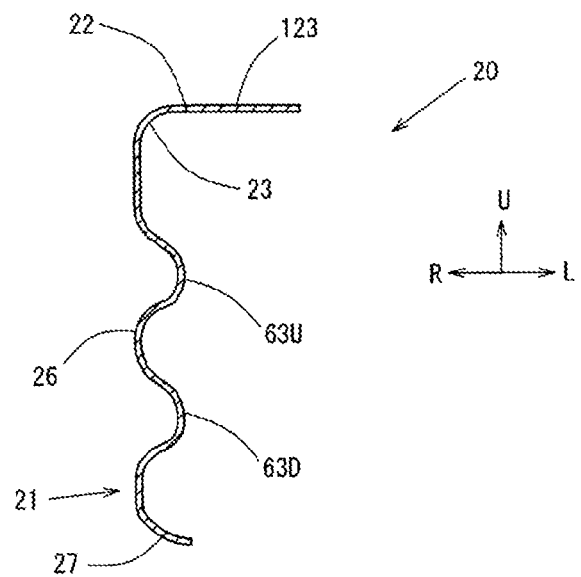
FIG. 9B is an enlarged sectional view taken along line C-C of FIG. 8B.

As shown in FIGS. 8B and 9A, the side wall portion 21 is formed over a whole length, in the vehicle longitudinal direction, of the outside bracket 20. Further, as shown in FIG. 9B, the corner portion 23 is configured such that an angle between the side wall portion 21 and the eaves-shaped flange portion 22 is nearly 90 degrees.

Figure 7:
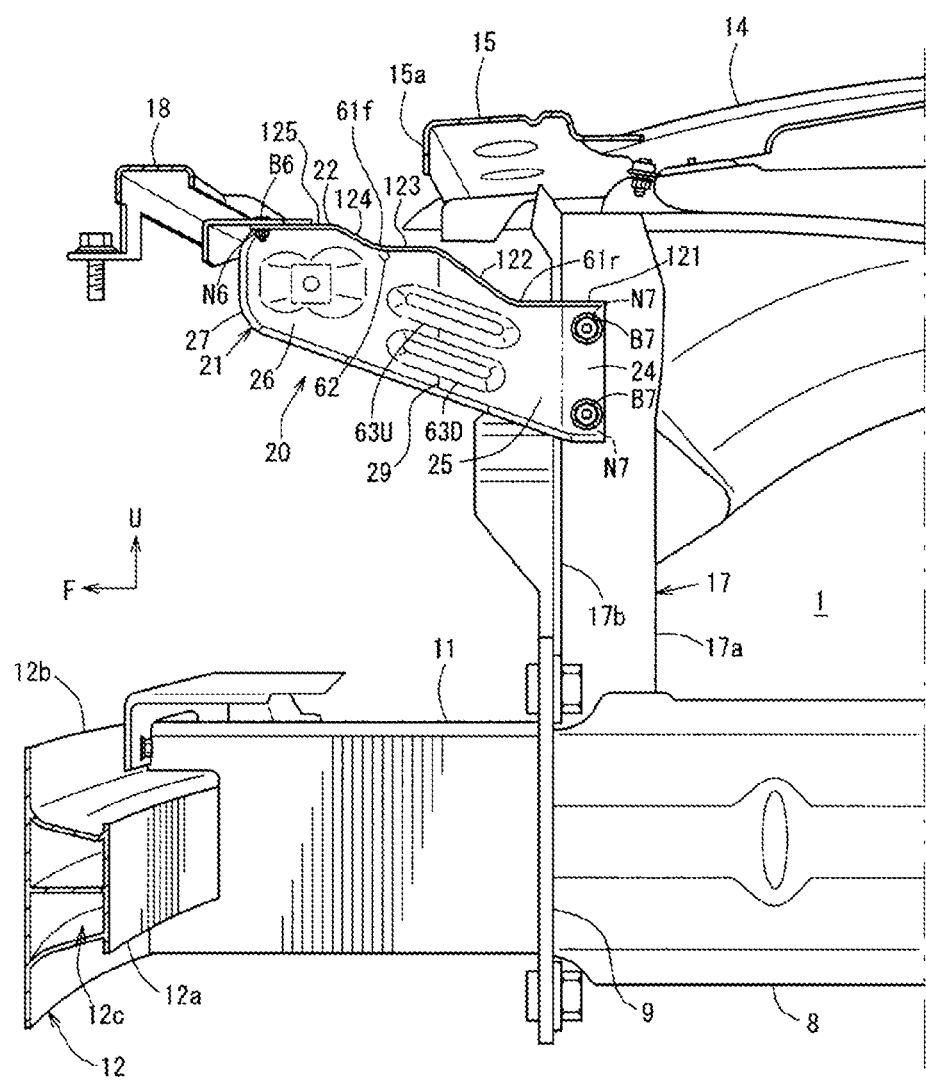
FIG. 7 is a sectional view taken along line A-A of FIG. 4.

Further, as shown in FIGS. 6 and 7, a front portion of the eaves-shaped flange portion 22 (a front-side horizontal upper edge portion 125 described later) is fixedly fastened to an outward-side portion, in the vehicle width direction, of the bumper-face support member 18 by a bolt B6 and a nut N6 as fastening means (see FIG. 7) in a state where it contacts this outward-side portion, in the vehicle width direction, of the bumper-face support member 18 from below. In FIG. 8A, reference character 220 denotes an attachment hole which is formed at a front portion of the eaves-shaped flange portion 22 for insertion of the bolt B6.

As shown in FIGS. 7, 8A and 8B, the outside bracket 20, in other words, comprises a fixation portion 24 which is fixed to the shroud-upper support frame 17 as the vehicle-body member, a base portion 25 which extends forwardly from the fixation portion 24, and an inclination portion 26 which is inclined relative to the base portion 25.

The fixation portion 24 is located in an area where the fixation portion extends forwardly from a rear end of the outside bracket 20, and fixedly fastened to the vertical-wall shaped vehicle-width-direction inner face portion 17a of the shroud-upper support frame 17 by bolts B7 and nuts N7 as fastening means in a state where it contacts the vehicle-width-direction inner face portion 17a as shown in FIG. 7. In FIG. 8B, reference character 240 denotes attachment holes for insertion of the bolts B7 which are formed upper-and-lower positions of the fixation portion 24.

The base portion 25 extends forwardly from a front end of the fixation portion 24. In the present embodiment, as shown in FIG. 8A, the base portion 25 extends such that an angle α (first angle α) between the fixation portion 24 and the base portion 25 becomes 180 degrees in the plan view, that is, straightly extends in a direction which matches the vehicle longitudinal direction in the plan view.

The inclination portion 26 is inclined from a front end of the base portion 25 via a bending portion 29 (see FIGS. 8A and 8B) such that its front side is positioned on the outward side, in the vehicle width direction, of the outside bracket 20. In the present embodiment, the bending portion 29 is configured such that an angle β (second angle β) between the base portion 25 and the inclination portion 26 is nearly 140 degrees as shown in FIG. 8A.

As shown in FIGS. 8A and 9A, the eaves-shaped flange portion 22 is configured to be continuous over a range from the vicinity of the front end of the outside bracket 20 to the bending portion 29 along an upper end of the side wall portion 21. The eaves-shaped flange portion 22 protrudes over its whole longitudinal length except its both ends having substantially the same width.

The outside bracket 20 has a peripheral flange portion 27 which is formed over a part of a periphery of the side wall portion 21 except its rear end and the eaves-shaped flange portion 22. The peripheral flange portion 27 protrudes inwardly similarly to the eaves-shaped flange portion 22, but its protrusion width is set to be shorter than that of the eaves-shaped flange portion 22. That is, the peripheral flange portion 27 extends along the periphery of the side wall portion 22 except a rear end of the side wall portion 21 so as to be continuous to the eaves-shaped flange portion 22, and protrudes along the periphery of the side wall portion 21 with substantially the same protrusion width.

Further, as shown in FIG. 8B, the outside bracket 20 is configured such that the fixation portion 24 extends horizontally in the vehicle longitudinal direction, whereas its part located on the forward side of the fixation portion 24, i.e., its part corresponding to the base portion 25 and the inclination portion 26 extends toward the bumper-face support member 18 obliquely such that its front side is located at the higher level.

Specifically, a part of a lower edge side 120D of the outside bracket 20 which corresponds to the base portion 25 and the inclination portion 26, including the peripheral flange portion 27, straightly extends obliquely such that its front side is located at the higher level.

Meanwhile, an upper edge side 120U of the outside bracket 20, including the peripheral flange portion 27 and the eaves-shaped flange portion 22, is formed stepwise (with two stages in the present embodiment) such that its front side is located at the higher level.

Specifically, as shown in FIGS. 8A, 8B and 9A, the upper edge side 120U of the outside bracket 20 is composed of a rear-side horizontal upper edge portion 121, a rear-side inclination upper edge portion 12, a middle horizonal upper edge portion 123, a front-side inclination upper edge portion 124, and a front-side horizontal upper edge portion 125 which extend in this order from a rear end to a front end of the upper edge side 120U.

The rear-side horizontal upper edge portion 121 is formed over a range from the base portion 25 of the fixation portion 24 to a middle position, in the longitudinal direction, of the base portion 25 of the outside bracket 20 and nearly horizontally extends in the vehicle longitudinal direction. The rear-side inclination upper edge portion 122 is formed over a range from the middle position, in the longitudinal direction, of the base portion 25 of the fixation portion 24 to the bending portion 29 (a border portion between the inclination portion 26 and the base portion 25) and extends from a front end of the rear-side horizontal upper edge portion 121 obliquely such that its front side is located at the higher level. The middle horizonal upper edge portion 123 is formed over a range from the bending portion 29 to a front-end position of a rear portion of the inclination portion 26, and forwardly extends nearly horizontally from a front end of the rear-side inclination upper edge portion 122. The front-side inclination upper edge portion 124 is formed over a range from the front end position of the rear portion of the inclination portion 26 to a middle position, in the longitudinal direction, of the inclination portion 26, and extends from a front end of the middle horizontal upper edge portion 123 obliquely such that its front side is located at the higher level. The front-side horizonal upper edge portion 125 is formed over a range from the middle position, in the longitudinal direction, of the inclination portion 26 to a front end of the inclination portion 26, and forwardly extends nearly horizontally from a front end of the front-side inclination upper edge portion 124.

Herein, as shown in FIG. 8B, since the rear-side horizontal upper edge portion 121 is downwardly recessed relative to the rear-side inclination upper edge portion 122 (located at a lower level) in the vehicle side view, a front end portion of the rear-side horizontal upper edge portion 121 is set at a rear-side recess portion 61r. Likewise, since the middle horizontal upper edge portion 123 is downwardly recessed relative to the front-side inclination upper edge portion 124 (located at a lower level) in the vehicle side view, a front end portion of the middle horizontal upper edge portion 123 is set at a front-side recess portion 61f.

As shown in FIGS. 8A, 8B and 9A, a fragile bead portion 62 is formed at a position, in the longitudinal direction, of the outside bracket 20 which corresponds to the front-side recess portion 61f. The fragile bead portion 62 is formed at around the corner portion 23 (see FIG. 9) located between the side wall portion 21 and the eaves-shaped flange portion 22. The fragile bead portion 62 is configured to protrude toward an inner-angle side of the side wall portion 21 and the eaves-shaped flange portion 22, and extends over an upper-end side portion of the side wall portion 21 and a vehicle-width-direction outer end side portion of the eaves-shaped flange portion 22 across the corner portion 23 extending in the longitudinal direction. That is, the fragile bead portion 62 is configured to cut a ridgeline extending in the vehicle longitudinal direction along the corner portion 23.

Further, as shown in FIGS. 8B, 9A and 9B, a pair of high-rigidity bead portions 63U, 63D which extend in the vehicle longitudinal direction are formed at the side wall portion 21. The pair of high-rigidity bead portions 63U, 63D are arranged in parallel to each other, having a distance in the vertical direction, and each of the high-rigidity bead portions 63U, 63D is configured to protrude inwardly in the vehicle width direction as shown in FIG. 9B.

Each of the high-rigidity bead portions 63U, 63D is configured to be continuous in the longitudinal direction over an area of a front side of the base portion 25 and a rear side of the inclination portion 26, passing through the bending portion 29. That is, the bending portion 29 is provided at the same position, in the longitudinal direction, as the high-rigidity bead portions 63U, 63D.

Further, each of the high-rigidity bead portions 63U, 63D straightly extends obliquely so as to be parallel to a part of the lower edge side 120D of the outside bracket 20 which reaches the base portion 25 and the inclination portion 26 in the vehicle side view (see FIG. 8B).

The lower-side high-rigidity bead portion 63D is configured such that its front end 63Df is positioned on the slightly rearward side of a front end 63Uf of the upper-side high-rigidity bead portion 63U and its rear end 63Dr is positioned on the slightly forward side of a rear end 63Dr of the upper-side high-rigidity bead portion 63U. Thereby, the lower-side high-rigidity bead portion 63D is configured to be slightly shorter than the upper-side high-rigidity bead portion 63U in the vehicle longitudinal direction.

Each of the fragile bead portion 62, the rear-side recess portion 61r, and the front-side recess portion 61f is a fragile portion which is configured to be deformable by receiving the load inputted to the outside bracket 20 in the longitudinal direction, which is provided adjacently to the high-rigidity bead portions 63U, 63D in the longitudinal direction.

Specifically, as shown in FIG. 8B, each of the fragile bead portion 62 and the front-side recess portion 61f is provided substantially at the same position as the front end 63Uf of the upper-side high-rigidity bead portion 63U in the longitudinal direction, and provided at a forward vicinity position of the front end 63Df of the lower-side high-rigidity bead portion 63D.

The rear-side recess portion 61r is provided substantially at the same position as the rear end 63U5 of the upper-side high-rigidity bead portion 63U in the longitudinal direction, and provided at a rearward vicinity position of the rear end 63Dr of the lower-side high-rigidity bead portion 63D.

Herein, in FIGS. 8A, 8B and 9A, reference character 28 denotes a base portion where a harness (not illustrated) and the like, which are installed around the outside bracket 20, are attached, and this base portion 28 is configured to protrude outwardly, in the vehicle width direction, so as to have a flat base surface 28a at an outward end, in the vehicle width direction, thereof.

Figure 10:
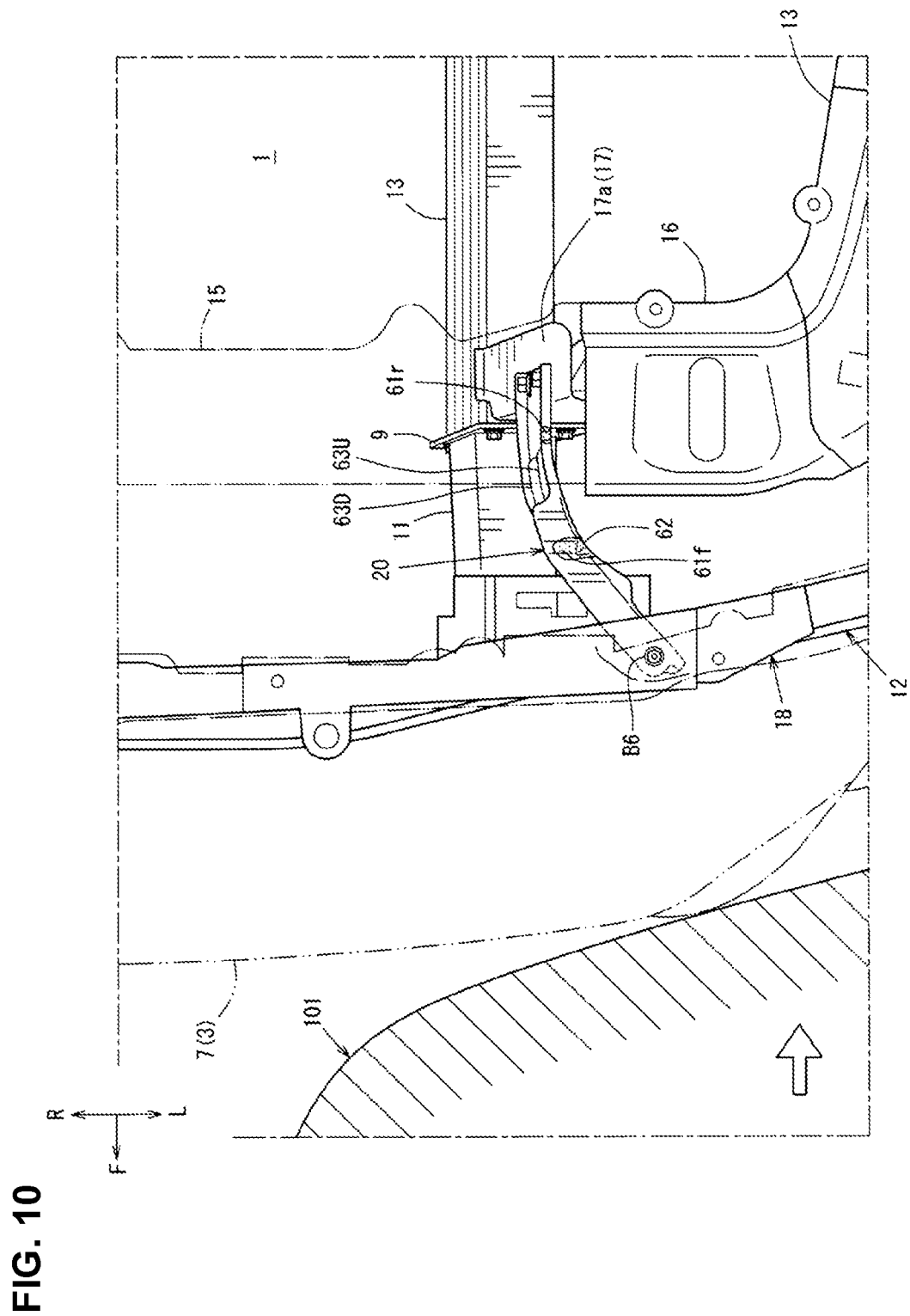
FIG. 10 is a plan view showing a situation of the major part shown in FIG. 6 just before a collision object lightly hits against a left-side part of the vehicle front portion from a vehicle forward side.
Figure 11A:
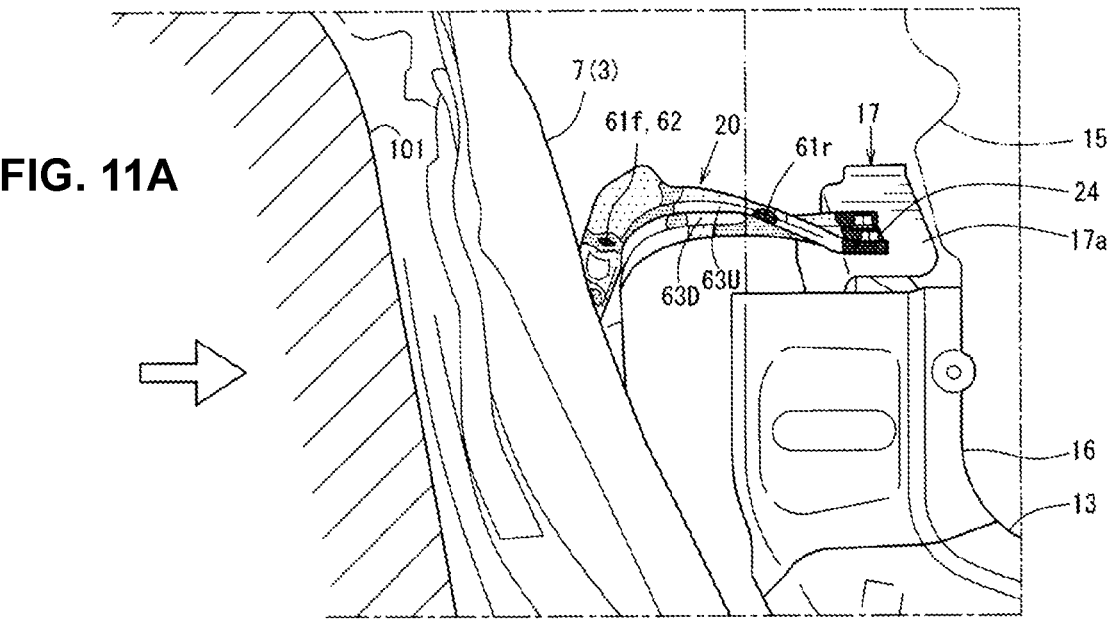
FIG. 11A is a plan view showing a distribution of stresses applied to the outside bracket in a middle stage of collision, corresponding to the major part shown in FIG. 10.
Figure 11B:
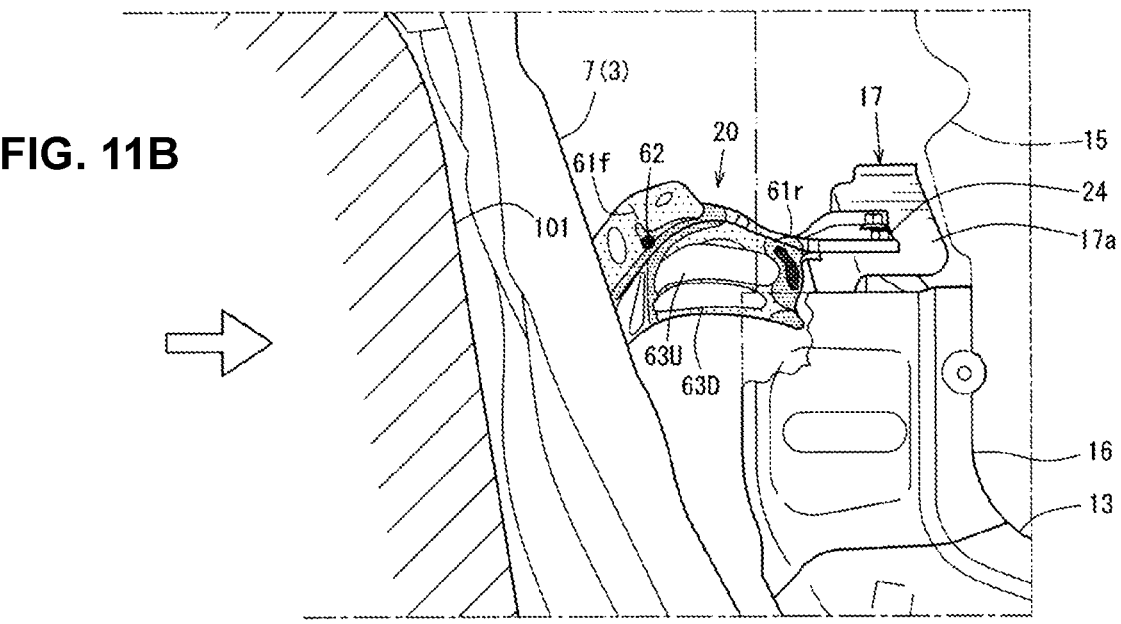
FIG. 11B is a plan view showing the distribution of stresses applied to the outside bracket in a late stage of collision, corresponding to the major part shown in FIG. 10.

Subsequently, a move of the outside bracket 20 in a case where a collision object 101 hits against the vehicle from the forward side (i.e., in the vehicle frontal collision) will be described referring to FIGS. 10, 11A and 11B. FIGS. 10, 11A and 11B are plan views of a major part of a left-side portion of the vehicle front portion, which show results of simulation analysis of the move of the vehicle front portion in the vehicle frontal collision. FIG. 10 shows an initial stage of the vehicle frontal collision, FIG. 11A shows a middle stage of the vehicle frontal collision, and FIG. 11B shows a late stage of the vehicle frontal collision.

Herein, FIGS. 10, 11A and 11B show a stress distribution of the collision load inputted to the outside bracket 20 in the vehicle frontal collision based on density of dots, wherein a portion with a higher density of dots shows an area where a larger bending-stress is generated.

Further, in order to clarify the drawings in FIGS. 11A and 11B, illustration of each of the front side frame 8, the crash can 11, the set plate 9, and the like is omitted here, and the shroud member 16 is shown in a partially-broken manner in FIG. 11B.

First, in the vehicle frontal collision, the bumper beam 12 receives the collision object 101 hitting from the vehicle forward side, and is retreated, and the crash can 11 is crushed in the vehicle longitudinal direction accordingly. Herein, since the bumper-face support member 18 is retreated together with the bumper beam 12, the load is inputted to the outside bracket 20 from the forward side.

Then, as shown in FIG. 10, in the initial stage of the vehicle frontal collision, the collision load inputted to the outside bracket 20 (stress) focusses on the front-side recess portion 61f and the fragile bead portion 62, and the rear-side recess portion 61r.

As shown in FIG. 11A, in the middle stage of the vehicle frontal collision, the collision load inputted to the outside bracket 20 (stress) further focusses on the front-side recess portion 61f and the fragile bead portion 62, and the rear-side recess portion 61r, so that the outside bracket 20 is bent and deformed with bending causing points of the front-side recess portion 61f and the fragile bead portion 62, and the rear-side recess portion 61r, such that the inclination portion 26 is inclined outwardly, in the vehicle width direction, relative to the fixation portion 24.

As shown in FIG. 11B, in the late stage of the vehicle frontal collision as well, the state where the collision load inputted to the outside bracket 20 (stress) focusses on the front-side recess portion 61f and the fragile bead portion 62, and the rear-side recess portion 61r similarly to the FIG. 11A is maintained, so that the inclination portion 26 is further inclined outwardly, in the vehicle width direction.

Thereby, since the outside bracket 20 is deformed without being stretched in the longitudinal direction in the vehicle frontal collision, the absorption performance of the collision energy of the vehicle-body front portion can be secured without hindering the crushing, in the longitudinal direction, of the crash can 11.

Figure 13:
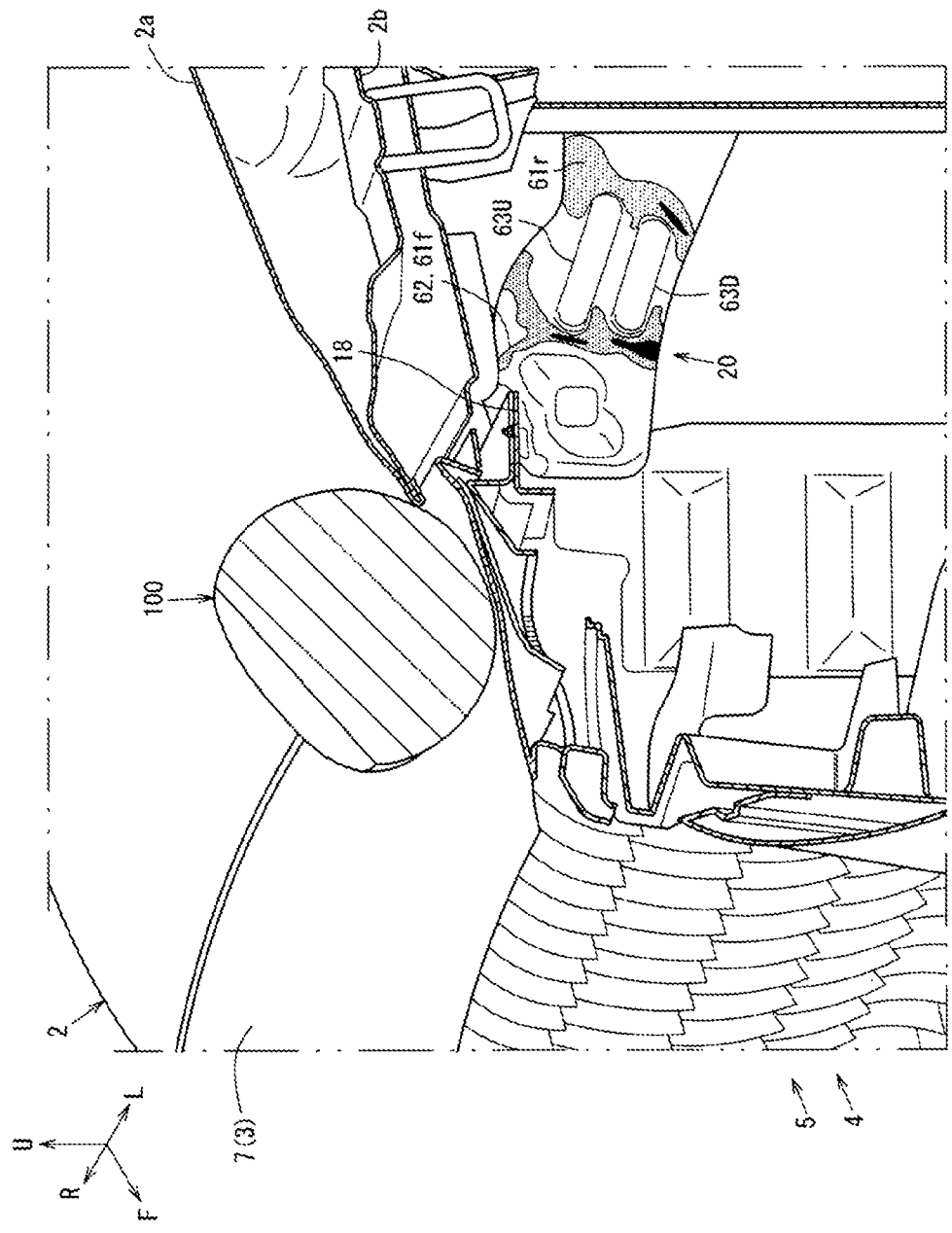
FIG. 13 is a perspective sectional view showing a distribution of stresses applied to the outside bracket just after the collision object hits against the front end of the bonnet from above, corresponding to FIG. 12.

Next, the move of the outside bracket 20 in a case where the collision object 100 hits against the vehicle front portion from above will be described referring to FIGS. 12 and 13. FIGS. 12 and 13 are perspective sectional views taken along line B-B of FIG. 4, which show results of simulation analysis of the move of the vehicle front portion in the case where the collision object 100 hits against the vehicle front portion from above. FIG. 12 shows a situation before the vehicle collision and FIG. 13 shows a situation after the vehicle collision.

Herein, FIG. 13 show a stress distribution of the collision load inputted to the outside bracket 20 in the vehicle frontal collision based on density of dots, wherein a portion with a higher density of dots shows an area where a larger bending-stress is generated.

In a case where the collision object 100 hits against the vehicle front portion shown in FIG. 12 from above, the collision load is transmitted downwardly through the bumper face upper 7, the bumper-face support member 18, and the outside bracket 20 in this order (see FIG. 13).

Then, the collision load inputted to the outside bracket 20 (stress) focus on the front-side recess portion 61f and the fragile bead portion 62, and the rear-side recess portion 61r as shown in FIG. 3. Thereby, the outside bracket 20 is deformed downwardly with the causing points of these portions 62, 61f, 61r such that the upper portion of the outside bracket 20 is twisted outwardly in the vehicle width direction, so that the damage degree of the collision object 100 can be reduced.

The front structure of the vehicle of the above-described present invention comprises, as shown in FIGS. 2-6, the vehicle-body member (15, 17) provided at the vehicle-body front portion, the bumper-face support member 18 extending in the vehicle width direction in front of the vehicle-body member (15, 17) and having the bumper-face attachment hole 18a (attachment portion) where the bumper face 3 (see FIG. 1) is attached, and the plural brackets 20, 30 fixedly connecting the vehicle-body member (15, 17) and the bumper-face support member 18, wherein the outside bracket 20 comprises, as shown in FIGS. 5, 6, 8A, 9A and 9B, the inclination portion 26 which is inclined such that its front side thereof is positioned on the outward side, in the vehicle width direction, of the outside bracket 20, the high-rigidity portion (63U, 63D), at least part of which is positioned at the inclination portion 26 and which is configured to have the high rigidity against the input of the load applied in the vehicle longitudinal direction, and the fragile portion (62, 61f, 61r) which is configured to be deformable by receiving the input of the load applied in the vehicle longitudinal direction, and the high-rigidity portion (63U, 63D) and the fragile portion (62, 61f, 61r) are provided adjacently to each other in the vehicle longitudinal direction.

The front structure of the vehicle according to the present invention can compatibly improve the support rigidity and the assembling accuracy of the bumper face 3 in the normal state and secure the collision stroke of the vehicle front portion in the vehicle frontal collision even if the vehicle has the high vehicle-height.

Specifically, the downward load is inputted to the bumper-face support member 18 even in the normal state because of each weight of the bumper face 3 and the bumper-face support member 18, a pressing-down force by a person's hand applied to the bumper face 3 for closing the bonnet 2, or the like.

Herein, since the front end portion of the bonnet is generally located at the level of the pedestrian's thigh portion in the vehicle having the high vehicle-height, there exists a structure in which the front end portion of the bonnet is retreated from a foremost portion of the vehicle in order to reduce an influence on a knee's ligament of the pedestrian in the vehicle collision like the vehicle of the present embodiment.

Thereby, this vehicle is configured such that the vehicle-body member, such as the shroud member 16 or the shroud upper panel 15 which are provided with the latch as a lock device of the bonnet 2, is retreated together width the bonnet's front end portion.

Accordingly, the length, in the vehicle longitudinal length, between the bumper-face support member 18 supporting the bumper face 3 and the vehicle-body member (15, 17), such as the shroud upper panel 15 supporting the bumper-face support member 18 in the cantilever shape from behind, becomes long. Therefore, in particular, in the vehicle having the high vehicle-height, when the above-described downward load is inputted to the bumper-face support member 18, there is a concern that a load applied to the brackets 20, 30 connecting the bumper-face support member 18 and the vehicle-body member (15, 17) in the vehicle longitudinal direction may become improperly large.

For this problem, meanwhile, in a case where the outside bracket is configured such that the bumper-face support member 18 and the vehicle-body member, such as the shroud upper panel 15, are connected with the shortest distance, there occurs a new problem that the energy-absorption quantity of the vehicle-body front portion may be hindered because the outside bracket is stretched in the vehicle frontal collision.

Herein, according to the present embodiment, the rigidity of the outside bracket 20 in the normal state can be improved by providing the high-rigidity portion (63U, 63D) at the outside bracket 20, so that the support rigidity and the assembling accuracy of the bumper face 3 can be improved.

Further, according to the present embodiment, even if the outside bracket 20 is configured to have the high-rigidity portion (63U, 63D) by providing the inclination portion 26 where at least part of the high-rigidity portion (63U, 63D) is positioned, a bending stress is easily generated at the outside bracket 20 in the vehicle frontal collision, and also the outside bracket 20 is configured to be easily deformed at the bending causing points of the fragile portion (62, 61f, 61r) adjacent to the high-rigidity portion (63U, 63D). Accordingly, the collision stroke can be secured by the outside bracket 20 being bent and deformed in the vehicle frontal collision.

In the embodiment of the present invention, as shown in FIGS. 8A, 8B and 9A, the outside bracket 20 comprises the base portion 25 which extends forwardly from the fixation portion 24 to the vehicle-body member by the first angle α (see FIG. 8A) in the plan view and the inclination portion 26 which extends forwardly from the front end portion of the base portion 25 via the bending portion 29 by the second angle β in the plan view.

According to this structure, the outside bracket 20 is made to be bent and deformed by the bending portion 29 in the vehicle frontal collision, so that the outside bracket 20 can be crushed properly.

In the embodiment of the present invention, as shown in the same figures, the bending portion 29 is located at the same position, in the vehicle longitudinal direction, as the high-rigidity portion (63U, 63D).

According to this structure, the bending portion 29 can be securely bent and deformed as a bending-deformation causing point even at the high-rigidity portion (63U, 63D) having the high resistance against the bending load, so that the energy-absorption quantity of the outside bracket 20 in the vehicle frontal collision can be improved.

In the embodiment of the present invention, as shown in FIGS. 8A, 8B, 9A and 9B, the outside bracket 20 comprises the side wall portion 21 which extends in the vertical direction and in the vehicle longitudinal direction and the eaves-shaped flange portion 22 (flange portion) which is configured to be bent from the upper end of the side wall portion 21 via the corner portion 23 (see FIG. 9B), and the fragile portion is the fragile bead portion 62 (bead portion) provided at the corner portion 23.

According to this structure, the rigidity of the outside bracket 20 can be increased by the corner portion 23 (ridgeline) extending in the vehicle longitudinal direction and also the bending deformation of the outside bracket 20 can be caused by the fragile bead portion 62 which is configured to cut the corner portion 23 (ridgeline) in the vehicle frontal collision.

Further, the rigidity decrease of the outside bracket 20 in the normal state, which is caused by providing the inclination portion 26, can be compensated by the high-rigidity portion (63U, 63D), at least part of which is provided at the inclination portion 26, and also the crushing of the outside bracket 20, including the high-rigidity portion (63U, 63D), can be caused by providing the fragile bead portion 62 in the vehicle frontal collision.

In the embodiment of the present invention, as shown in FIGS. 8A, 8B and 9A, the fragile portion is the front-side recess portion 61f and the rear-side recess portion 61r (recess portion) which are respectively configured to be recessed downwardly, in the side view, at the upper edge side 120U (upper end portion) of the outside bracket 20.

According to this structure, since the ridgeline extending along in the vehicle width direction is formed at each of the front-side recess portion 61f and the rear-side recess portion 61r which are provided at the upper edge side 120U of the outside bracket 20, the front-side recess portion 61f and the rear-side recess portion 61r cause the outside bracket 20 to be deformed such that its front portion positioned on the forward side of these recess portions 61f, 61r is bent downwardly relative to its rear portion positioned on the rearward side of these recess portions 61f, 61r when the downward collision load is inputted to the bumper-face support member 18 (i.e., when the load is inputted to the front portion of the outside bracket 20 from above). Accordingly, the pedestrian's protection performance can be improved.

In the embodiment of the present invention, as shown in the same figures, the front-side recess portion 61f (recess portion) and the fragile bead portion 62 (bead portion) are provided at the same position, in the vehicle longitudinal direction, of the outside bracket 20.

According to this structure, securing of the collision stroke by the deformation, in the vehicle longitudinal direction, of the outside bracket 20 and reducing of the damage degree of the collision object (the pedestrian's protection performance) by the downward deformation of the bracket in the vehicle frontal collision can be compatibly attained.

That is, the fragile bead 62 and the front-side recess portion 61f which are provided at the same position in the longitudinal direction can securely cause the deformation, in the longitudinal direction, of the outside bracket 20 in the vehicle frontal collision in cooperation with each other.

Likewise, the fragile bead 62 and the front-side recess portion 61f which are provided at the same position in the longitudinal direction can securely cause the downward deformation of the outside bracket 20 when the collision load is downwardly inputted to the bumper-face support member 18 in cooperation with each other, so that the reduction effect of the damage degree of the collision object (pedestrian's protection performance) can be improved.

Thus, according to this structure, the securing of the collision stroke by the deformation, in the vehicle longitudinal direction, of the outside bracket 20 and the reducing of the damage degree of the collision object by the downward deformation of the outside bracket 20 in the vehicle frontal collision can be compatibly attained.

In the embodiment of the present invention, as shown in FIG. 8B, the front-side recess portion 61f and the front end 63Uf of the upper-side high-rigidity bead portion 63U are provided at the same position, in the vehicle longitudinal direction, of the outside bracket 20, and the rear-side recess portion 61r and the rear end 63Ur of the upper-side high-rigidity bead portion 63U are provided at the same position, in the vehicle longitudinal direction, of the outside bracket 20.

Each of the front end and the rear end of the high-rigidity portion (63U, 63D) corresponds to a border portion, in the longitudinal direction, between a section of the outside bracket 20 where the high-rigidity portion (63U, 63D) is provided and another portion of the outside bracket 20 where the high-rigidity portion (63U, 63D) is not provided. Accordingly, by providing the front-side recess portion 61f and the rear-side recess portion 61r at or around this point where the rigidity difference exists of the outside bracket 20 in the longitudinal direction, deformation of this point for the fontal-collision load or the downward load can be caused.

Accordingly, the securing of the collision stroke by the deformation, in the vehicle longitudinal direction, of the outside bracket 20 and the reducing of the damage degree of the collision object (the pedestrian's protection performance) by the downward deformation of the outside bracket 20 in the vehicle frontal collision can be compatibly attained further.

The present invention is not limited to the above-described embodiment, but can be materialized by various modifications. The inclination portion of the present invention is not limited to the inclination portion 26 described in the present embodiment which is inclined such that its front side is located on the vehicle outward side, but it may be inclined toward the vehicle inward side. Further, an inclination manner (i.e., being inclined toward the vehicle outward side or toward the vehicle inward side) of the inclination portion of the present invention may be differentiated between the inclination portion provided at the left-side outside bracket and the inclination portion provided at the right-side outside bracket.

Further, while the first angle $\alpha$ is set at 180 degrees as shown in FIG. 8A in the present embodiment, the present invention is not limited to this structure, but the base portion 25 may be inclined, similarly to the inclination portion 26, such that its font side is located on the inwards side or on the outward side relative to the fixation portion 24.

Moreover, the fragile portion of the present invention is not limited to the structure of the recess portion (61f, 61r) of the above-described embodiment in which the portion of the upper end portion of the bracket which is located on the rearward side of the recess portion is located at the lower level than the portion of the upper end portion of the bracket which is located on the forward side of the recess portion, but the structure in which the portion located on the forward side is located at the lower level than the portion located on the rearward side may be applied, or the recess portion may be located at the lower level than both of the portion located on the rearward side and the portion located on the froward side.

Also, the present invention in which the fragile bead portion 62 and the front-side recess portion 61f are located substantially at the same position in the longitudinal direction is not limited to the above-described embodiment which relates to the front end 63Uf of the upper-side high-rigidity bead portion 63U, but the front end 63Df of the lower-side high-rigidity bead portion 63D is applicable. Likewise, regarding the structure in which the fragile bead portion 62 and the rear-side recess portion 61r are located substantially at the same position in the longitudinal direction, the rear end 63Dr of the lower-side high-rigidity bead portion 63D is applicable as well as the rear end 63Dr of the upper-side high-rigidity bead portion 63U.

What is claimed is:

1. A front structure of a vehicle, comprising:
    a vehicle-body member provided at a vehicle-body front portion;
    a bumper-face support member extending in a vehicle width direction in front of the vehicle-body member and having an attachment portion where a bumper face is attached; and
    a bracket fixedly connecting the vehicle-body member and the bumper-face support member,
    wherein said bracket comprises a base portion attached to the vehicle-body member and extending forward in a vehicle longitudinal direction, an inclination portion continuous with and extending forward from the base portion, the inclination portion being inclined such that a front side thereof is positioned on an inward or outward side, in the vehicle width direction, of the bracket and is attached to the bumper-face support member, a high-rigidity portion continuous in the vehicle longitudinal direction over an area of a front part of the base portion and a rear part of the inclination portion and which is configured to have high rigidity against an input of a load applied in the vehicle longitudinal direction, and a fragile portion which is configured to be deformable by receiving the input of the load applied in the vehicle longitudinal direction, and
    wherein said high-rigidity portion and said fragile portion are provided adjacently to each other in the vehicle longitudinal direction in the inclination portion.

2. The front structure of the vehicle of claim 1, wherein said base portion extends forwardly from a fixation portion of the bracket to said vehicle-body member by a first angle in a plan view and said inclination portion extends forwardly from a front end portion of said base portion via a bending portion by a second angle in the plan view.

3. The front structure of the vehicle of claim 2, wherein said bending portion is located at the same position, in the vehicle longitudinal direction, as said high-rigidity portion.

4. The front structure of the vehicle of claim 3, wherein said bracket comprises a side wall portion which extends in a vertical direction and in the vehicle longitudinal direction and a flange portion which is configured to be bent from an upper end of said side wall portion via a corner portion, and said fragile portion is a bead portion provided at said corner portion.

5. The front structure of the vehicle of claim 4, wherein said fragile portion is a recess portion which is configured to be recessed downwardly, in a side view, at an upper end portion of said bracket.

6. The front structure of the vehicle of claim 5, wherein said recess portion and said bead portion are provided at the same position, in the vehicle longitudinal direction, of the bracket.

7. The front structure of the vehicle of claim 6, wherein at least one of a front end portion and a rear end portion of said high-rigidity portion and said recess portion are provided at the same position, in the vehicle longitudinal direction, of the bracket.

8. The front structure of the vehicle of claim 1, wherein said bracket comprises a side wall portion which extends in a vertical direction and in the vehicle longitudinal direction and a flange portion which is configured to be bent from an upper end of said side wall portion via a corner portion, and said fragile portion is a bead portion provided at said corner portion.

9. The front structure of the vehicle of claim 8, wherein said fragile portion is a recess portion which is configured to be recessed downwardly, in a side view, at an upper end portion of said bracket.

10. The front structure of the vehicle of claim 2, wherein said bracket comprises a side wall portion which extends in a vertical direction and in the vehicle longitudinal direction and a flange portion which is configured to be bent from an upper end of said side wall portion via a corner portion, and said fragile portion is a bead portion provided at said corner portion.

11. The front structure of the vehicle of claim 1, wherein said high-rigidity portion is a bead portion which is formed at a side wall portion of said bracket and extends in the vehicle longitudinal direction.

12. The front structure of the vehicle of claim 11, wherein said bead portion is composed of a pair of bead portions which are arranged in parallel to each other, having a distance in a vertical direction, and each of the pair of bead portions is configured to protrude inwardly in the vehicle width direction.

* * * * *